United States Patent
Lai et al.

(10) Patent No.: US 9,335,815 B2
(45) Date of Patent: May 10, 2016

(54) METHOD AND SYSTEM FOR BATTERY POWER SAVING

(71) Applicant: Beijing Netqin Technology Co., Ltd., Beijing (CN)

(72) Inventors: Mubin Lai, Beijing (CN); Shihong Zou, Beijing (CN); Yu Lin, Beijing (CN)

(73) Assignee: Beijing Netqin Technology Co., Ltd., Beijing (CN)

( * ) Notice: Subject to any disclaimer, the term of this patent is extended or adjusted under 35 U.S.C. 154(b) by 234 days.

(21) Appl. No.: 14/129,730

(22) PCT Filed: Dec. 7, 2012

(86) PCT No.: PCT/CN2012/086160
§ 371 (c)(1),
(2) Date: Dec. 27, 2013

(87) PCT Pub. No.: WO2013/083075
PCT Pub. Date: Jun. 13, 2013

(65) Prior Publication Data
US 2014/0195843 A1    Jul. 10, 2014

(30) Foreign Application Priority Data
Dec. 9, 2011 (CN) .......................... 2011 1 0409204

(51) Int. Cl.
G06F 1/32 (2006.01)
H04W 52/02 (2009.01)

(52) U.S. Cl.
CPC ............ *G06F 1/3287* (2013.01); *G06F 1/3209* (2013.01); *G06F 1/3212* (2013.01); *H04W 52/0209* (2013.01); *H04W 52/0216* (2013.01); *H04W 52/0261* (2013.01); *Y02B 60/50* (2013.01)

(58) Field of Classification Search
CPC ... G06F 1/3287; G06F 1/3209; G06F 1/3212; H04W 52/0216; H04W 52/0209
See application file for complete search history.

(56) References Cited

U.S. PATENT DOCUMENTS 7,224,937 B2    5/2007    Cheng
9,172,117 B2 *  10/2015   Katpelly .............. G06F 1/3203
(Continued)

FOREIGN PATENT DOCUMENTS

CN    101977272 A    2/2011
CN    102238273 A    11/2011

OTHER PUBLICATIONS

International Search Report dated Mar. 21, 2013, published in English, for International Patent Application No. PCT/CN2012/086160 (2 pages).
(Continued)

*Primary Examiner* — Stefan Stoynov
(74) *Attorney, Agent, or Firm* — Michael J. Donohue; Davis Wright Tremaine LLP

(57) ABSTRACT

The present disclosure provides a method and system for saving battery power. The method comprises: determining whether a new program has been initiated by a user and, when a new program has been initiated by the user, storing the new program initiated by the user in a history database; determining whether the user is connected to a network and, when the user is connected to a network, storing a network connection record of the user in the history database; determining whether a battery level triggers a dynamic power saving schedule and, when the battery level triggers the dynamic power saving schedule, performing the power saving schedule using a power saving scheduling engine; and determining whether a screen being turned off triggers a dynamic network schedule and, when the screen being turned off triggers the dynamic network schedule, performing the network schedule using a network scheduling engine. The method for saving battery power according to the present disclosure provides an improved intelligence in program control and/or network management.

18 Claims, 7 Drawing Sheets

(56) References Cited

U.S. PATENT DOCUMENTS

| | | | |
|---|---|---|---|
| 2006/0014516 A1 | 1/2006 | Cheng | |
| 2007/0192641 A1* | 8/2007 | Nagendra | G06F 1/3203 713/320 |
| 2012/0210277 A1* | 8/2012 | Bowen | G06F 1/3206 715/859 |
| 2012/0233480 A1 | 9/2012 | Tanaka | |
| 2015/0089262 A1* | 3/2015 | Cairns | G06F 1/32 713/323 |

OTHER PUBLICATIONS

International Search Report and Written Opinion dated Mar. 21, 2013, in International Patent Application No. PCT/CN2012/086160, filed Dec. 7, 2012, 10 pages.

* cited by examiner

METHOD AND SYSTEM FOR BATTERY POWER SAVING

This application is the United States National Phase of International Application PCT/CN2012/086160, filed Dec. 7, 2012. This application also includes a claim of priority to Chinese Application No. 201110409204.7 filed Dec. 9, 2011.

TECHNICAL FIELD

The present disclosure relates to a method and system for saving battery power, and more particularly, to a method and system for intelligently controlling to save battery power in a mobile device (e.g., an Android mobile phone).

BACKGROUND

There are currently some software products capable of saving battery power for mobile devices, including JuiceDefender, Kingsoft Battery Doctor, DX Power Manager and other small products provided by Android Market.

The existing functional software products provide fundamental functions for prolonging lifetime of a battery after it is charged, including mainly program control, network management and the like. However, they are not sufficiently intelligent and the above functions generally require at least some manual operation by a user.

In particular, in the program control, the existing functional software products only provide power consumption data and a manual selection by the user is needed to terminate any power consuming process. In the network management, the existing functional software products only provide the user with a prompt for manually disabling all network connections in the event of an extremely low battery level or force to disable network connections in a standby state, which degrades the user experience.

There is thus a need for a method and system for saving battery power with an improved intelligence in program control and/or network management for a mobile device.

SUMMARY

It is an object of the present disclosure to intelligently reduce the power consumption of an operating system of a mobile device (e.g., an Android mobile phone) at the application level, thereby prolonging the lifetime of a battery after it is charged.

In the power control, the present disclosure can intelligently and dynamically deactivate a power consuming process based on user habits, without affecting the user. In the network management, the present disclosure can intelligently and dynamically disable a network connection during a predetermined period and predict a period of time during which the user will use the network based on user habits, thereby maintaining the network connection when the user may frequently use the network, without causing the user to suffer from frequent connection losses.

According to an aspect of the present disclosure, a method for saving battery power in a mobile device is provided. The method comprises the following steps of: determining whether a new program has been initiated by a user and, when a new program has been initiated by the user, storing the new program initiated by the user in a history database; determining whether the user is connected to a network and, when the user is connected to a network, storing a network connection record of the user in the history database; determining whether a battery level triggers a dynamic power saving schedule and, when the battery level triggers the dynamic power saving schedule, performing the power saving schedule using a power saving scheduling engine; and determining whether a screen being turned off triggers a dynamic network schedule and, when the screen being turned off triggers the dynamic network schedule, performing the network schedule using a network scheduling engine.

In one embodiment, the method for saving battery power further comprises: initializing the method for saving battery power before the method for saving battery power begins.

In one embodiment, the step of storing the network connection record of the user in the history database comprises: determining whether there has been a record for the network to which the user is connected in the history database and, when there is no record for the network to which the user is connected, creating a record for the network.

In one embodiment, the step of storing the new program initiated by the user in the history database comprises: determining whether there has been a record for the new program initiated by the user in the history database and, when there is no record for the new program initiated by the user in the history database, creating a record for the program.

In one embodiment, the step of storing the new program initiated by the user in the history database comprises: returning to the step of determining whether a new program has been initiated by the user after storing the new program initiated by the user in the history database.

In one embodiment, the step of performing the power saving schedule using the power saving scheduling engine comprises: returning to the step of determining whether a new program has been initiated by the user after performing the power saving schedule using the power saving scheduling engine.

In one embodiment, the step of performing the network schedule using the network scheduling engine comprises: returning to the step of determining whether a new program has been initiated by the user after performing the network schedule using the network scheduling engine.

In one embodiment, the step of storing the network connection record of the user in the history database comprises: returning to the step of determining whether a new program has been initiated by the user after storing the network connection record of the user in the history database.

In one embodiment, the step of performing the power saving schedule using the power saving scheduling engine comprises: calculating a total power consumption value of all currently running programs; comparing the total power consumption value with a threshold W suitable for a current power level percentage and listing each background program among all the currently running programs in a scheduling list, the threshold W being automatically adjusted based on the current power level percentage and being proportional to the current power level percentage; obtaining a program that is likely to be executed next by the user and excluding it from the scheduling list; excluding from the scheduling list each program in a white list defined by the user, the white list contains a series of programs defined by the user as not being controlled by the power saving schedule; and automatically deactivating or prompting the user to deactivate each program in the scheduling list.

In one embodiment, the step of obtaining the program that is likely to be executed next by the user comprises: treating, by a background engine, all the currently running programs as a Markov stochastic sequence based on the history database, so as to obtain a state transition matrix for any two programs by analyzing transition relationships among the programs in the sequence; calculating, based on the state transition matrices, a probability that each program will be the program to be executed next using Markov process; and determining the program that is likely to be executed next by the user based on the calculated probabilities.

In one embodiment, the step of determining the program that is likely to be executed next by the user based on the calculated probabilities comprises: determining the program that is likely to be executed next by the user based on a time dependency, the time dependency being indicative of an extent to which the program is dependent on time.

In one embodiment, the step of performing the network schedule using the network scheduling engine comprises: determining a current network environment using the history database based on current time and the connected network, wherein the history database stores a network environment record associated with a network SSID and the time during which the network is used by the user and specifying a policy for managing a background network; and managing the background network when the mobile device is not used by the user based on the policy for the current network environment and a frequency at which the user is connected to the network, so as to automatically connect to the network when the user uses the network and maintain the network disconnected when the user does not use the network.

According to another aspect of the present disclosure, a system for saving battery power in a mobile device is provided. The system comprises: a storage module configured to store a history database; a new program initiation determination module configured to determine whether a new program has been initiated by a user and, when a new program has been initiated by the user, store the new program initiated by the user in the history database in the storage module; a network connection determination module configured to determine whether the user is connected to a network and, when the user is connected to a network, store a network connection record of the user in the history database in the storage module; a battery level determination module configured to determine whether a battery level triggers a dynamic power saving schedule; a power saving scheduling module configured to perform the power saving schedule using a power saving scheduling engine when the battery level determination module determines that the battery level triggers the dynamic power saving schedule; a screen off determination module configured to determine whether a screen being turned off triggers a dynamic network schedule; and a network scheduling module configured to perform the network schedule using a network scheduling engine when the screen off determination module determines that the screen being turned off triggers the dynamic network schedule.

In one embodiment, the system for saving battery power further comprises: a network determination module configured to determine whether there has been a record for the network to which the user is connected in the history database and, when there is no record for the network to which the user is connected, create a record for the network.

In one embodiment, the system for saving battery power further comprises: an initialization module configured to initialize operation of the system for saving battery power.

In one embodiment, the power saving scheduling module comprises: a total power consumption calculation module configured to calculate a total power consumption value of all currently running programs; a program list module configured to compare the total power consumption value with a threshold W suitable for a current power level percentage and list each background program among all the currently running programs in a scheduling list, the threshold W being automatically adjusted based on the current power level percentage and being proportional to the current power level percentage; an exclusion module configured to obtain a program that is likely to be executed next by the user and exclude it from the scheduling list, and exclude from the scheduling list each program in a white list defined by the user, the white list contains a series of programs defined by the user as not being controlled by the power saving schedule; and a deactivation module configured to automatically deactivate or prompt the user to deactivate each program in the scheduling list.

In one embodiment, the network scheduling module comprises: a network environment determination module configured to determine a current network environment using the history database based on current time and the connected network, wherein the history database stores a network environment record associated with a network SSID and the time during which the network is used by the user and specifying a policy for managing a background network; and a network management module configured to manage the background network when the mobile device is not used by the user based on the policy for the current network environment and a frequency at which the user is connected to the network, so as to automatically connect to the network when the user uses the network and maintain the network disconnected when the user does not use the network.

DETAILED DESCRIPTION

Reference is now made to various embodiments of the present disclosure which are illustrated in the figures and described in the following. Although the present disclosure will be described with reference to the exemplary embodiments, it can be appreciated that the description does not intend to limit the present disclosure to these exemplary embodiments. In contrast, in addition to these exemplary embodiments, various modifications, alternations and equivalents of the embodiments that can be made without departing from the spirit and scope of the present disclosure as defined by the attached claims are also encompassed by the present disclosure.

Figure 1:
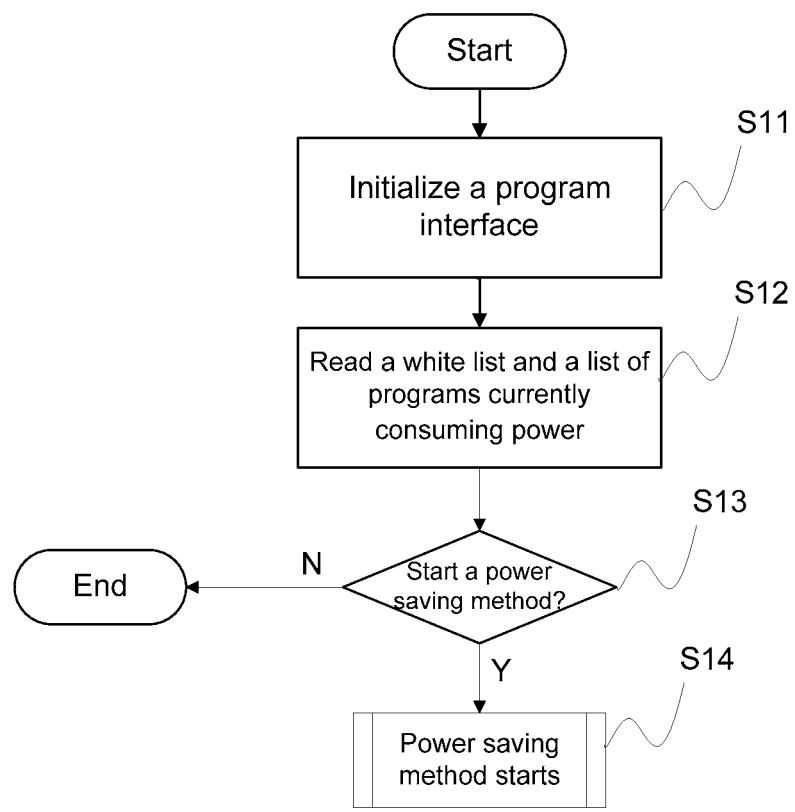
FIG. 1 is a flowchart illustrating a process for starting a method for saving battery power according to an embodiment of the present disclosure.

FIG. 1 is a flowchart illustrating a process for starting a method for saving battery power according to an embodiment of the present disclosure. Initially, at step S11, a program interface for the power saving method of the present disclosure is initialized. Then, at step S12, a white list defined by a user is read and a list of programs currently consuming power is also read. Here the white list contains a series of programs defined by the user as not being controlled by a power saving schedule. Next, at step S13, it is determined whether the user has enabled the power saving method. If the user has enabled the power saving method, the process proceeds with step S14 where the power saving method is started; otherwise, the process ends.

Figure 2:
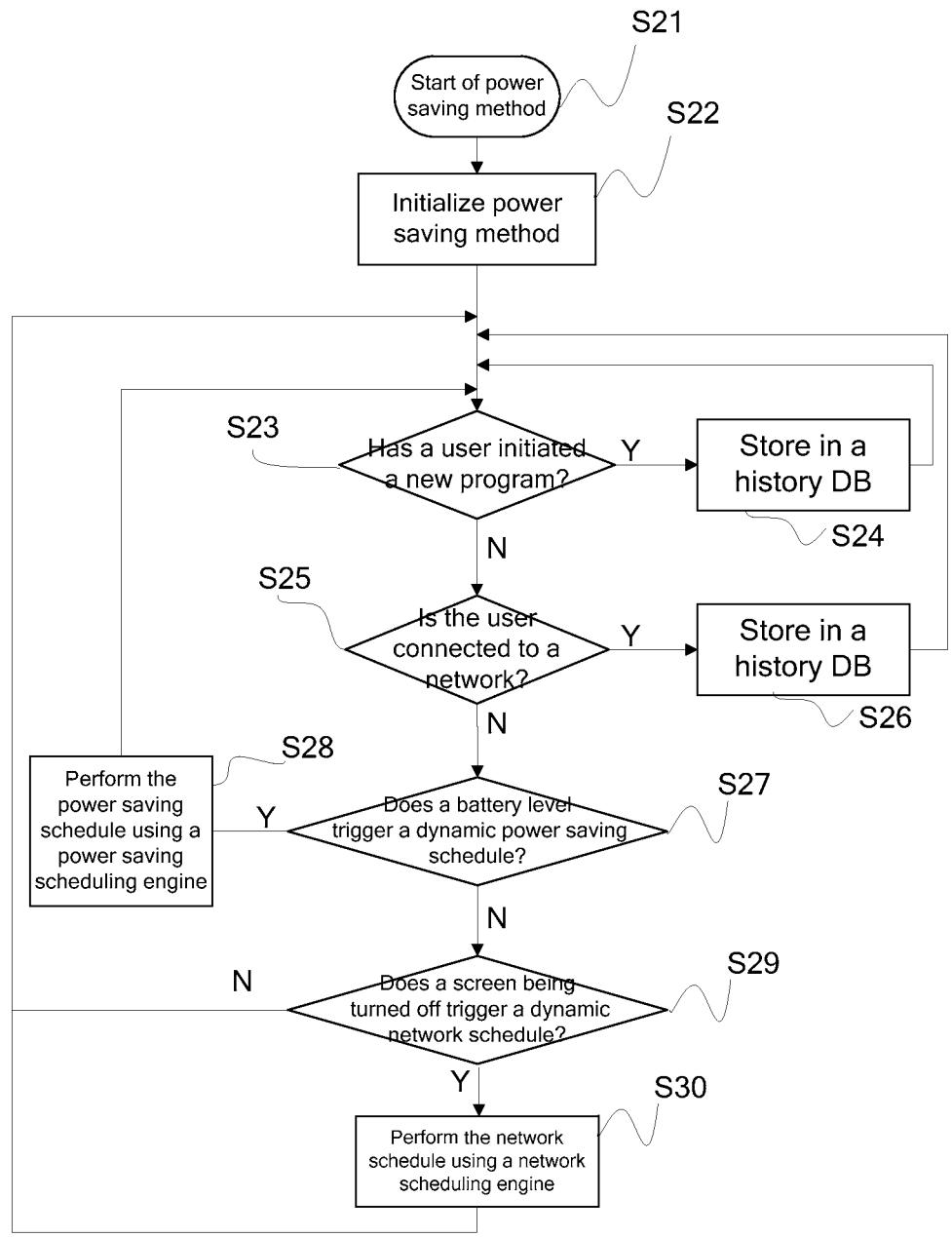
FIG. 2 is a flowchart illustrating a method for saving battery power according to an embodiment of the present disclosure.

FIG. 2 is a flowchart illustrating a method for saving battery power according to an embodiment of the present disclosure in detail. After the power saving method is started at step S21, at step S22, the power saving method is initialized. It should be noted that, for the power saving method according to the present disclosure, the steps S21 and S22 are optional and can be skipped to perform the following steps directly.

At step 23, it is determined whether the user has initiated a new program. If the user has initiated a new program, the method proceeds with step S24 where the new program initiated by the user is stored in a history database. Then the method continues. In an alternative embodiment, the method returns to the step S23 to determine again whether the user has initiated a new program.

If it is determined at the step S23 that the user has not initiated a new program, the method proceeds with step S25 where it is determined whether the user is connected to a network. If the user is connected to a network, the method proceeds with step S26 where a network connection record of the user is stored in the history database. Then the method continues. In an alternative embodiment, the method returns to the step S23 to determine again whether the user has initiated a new program.

If it is determined at the step S25 that the use is not connected to the network, the method proceeds with step S27 where it is determined whether a battery level triggers a dynamic power saving schedule. If the battery level triggers the dynamic power saving schedule, the method proceeds with step S28 where the power saving schedule is performed using a power saving scheduling engine. Then the method continues. In an alternative embodiment, the method returns to the step S23 to determine again whether the user has initiated a new program.

If it is determined at the step S27 that the battery level does not trigger the dynamic power saving schedule, the method proceeds with step S29 where it is determined whether a screen being turned off triggers a dynamic network schedule. If the screen being turned off triggers the dynamic network schedule, the method proceeds with step S30 where the network schedule is performed using a network scheduling engine. Then, preferably, the method returns to the step S23 to determine again whether the user has initiated a new program.

If it is determined at the step S30 that the screen being turned off does not trigger the dynamic network schedule, preferably, the method returns to the step S23 to determine again whether the user has initiated a new program.

Figure 3:
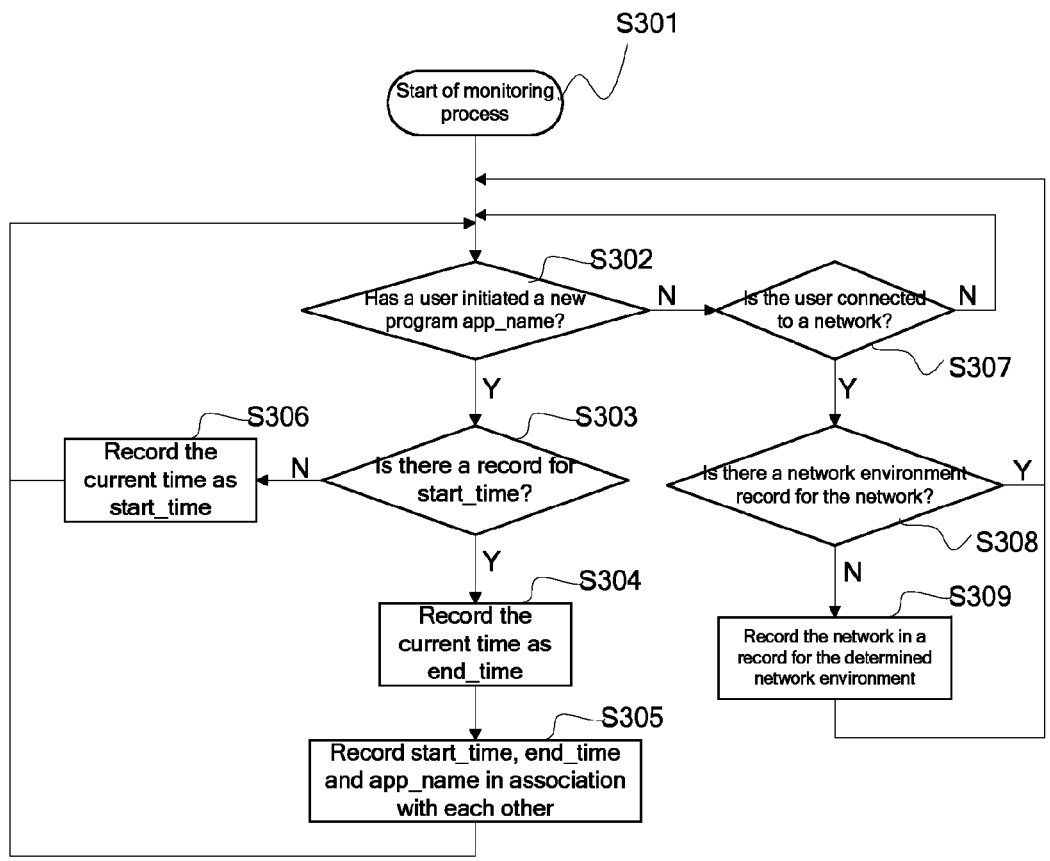
FIG. 3 is a flowchart illustrating a process for creating a history database according to an embodiment of the present disclosure.

Additionally, the creation of the history database is well known in the related art. An example will be given below with reference to FIG. 3. In this example, initially at step S301, a monitoring process is started. Then at step S302, it is determined whether the user has initiated a program "app_name". If so, at step S303, the history database is searched to determine whether there has been a record for the start time (start_time) of the program app_name, i.e., to determine whether start_time has been assigned a value. If start_time has been assigned a value, the method proceeds with step S304 where the current time is recorded as the end time (end_time) and step S305 where start_time, end_time and app_name are recorded in the history database in association with each other. Otherwise, if start_time has not been assigned a value, at step S306, the current time is recorded as start_time of the program app_name in the history database and the method returns to the step S302.

If it is determined at the step S302 that the user has not initiated a program, the method proceeds with step S307 where it is determined whether the user is connected to a network. If so, at step S308, the history dataset is searched to determine whether there has been a record for the network to which the user is connected. If there is no record for the network to which the user is connected, the method proceeds with step S309 where a network environment is determined based on the current time and the network to which the user is connected and the current time are recorded in a record for the determined network environment in the history database in association with each other. Then, the method returns to the step S302.

If the determination result in the step S308 is affirmative, i.e., if there has been a record for the network to which the user is connected in the history database, the method returns to the step S302.

Therefore, the created history database has stored therein a record for each program the user had used and a record for each network the user had been connected to.

Figure 4:
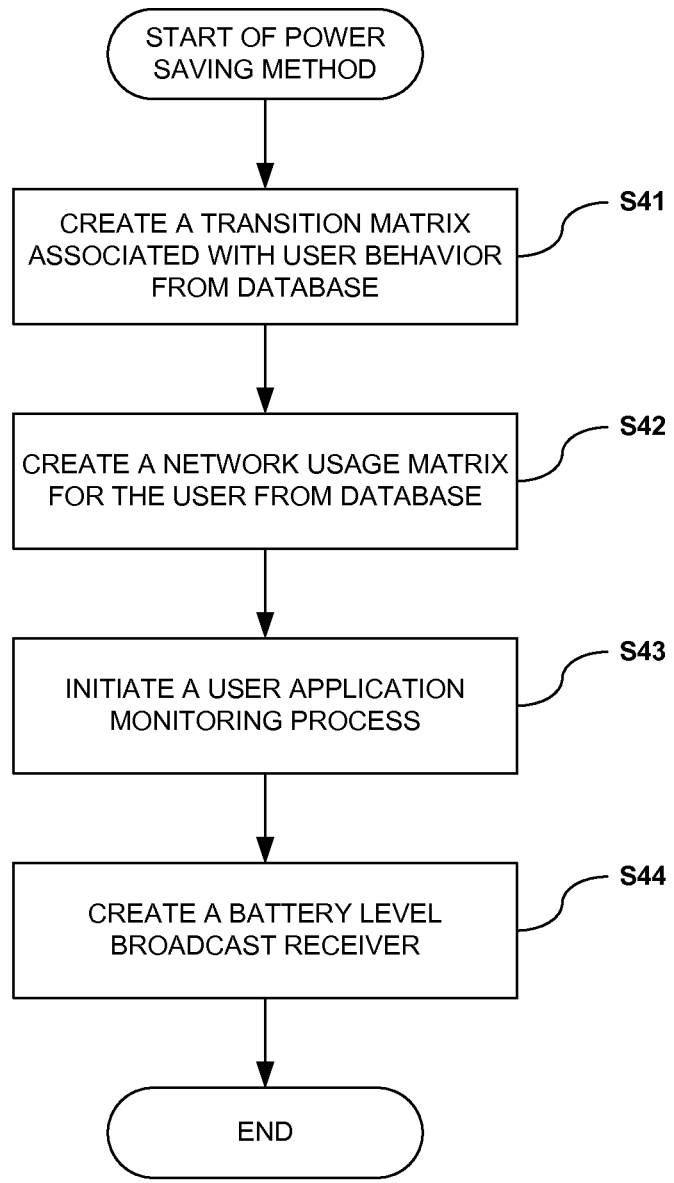
FIG. 4 is a flowchart illustrating a process for initializing a method for saving battery power according to an embodiment of the present disclosure.

FIG. 4 is a flowchart illustrating a process for initializing a method for saving battery power according to an embodiment of the present disclosure. This initialization process includes the following steps. Initially, at step S41, a transition matrix associated with user behavior is created from the history database. Then at step S42, a network usage matrix for the user is created from the history database. Next, at step S43, a user application monitoring process is initiated. Finally at step S44, a battery level broadcast receiver is created.

Figure 5:
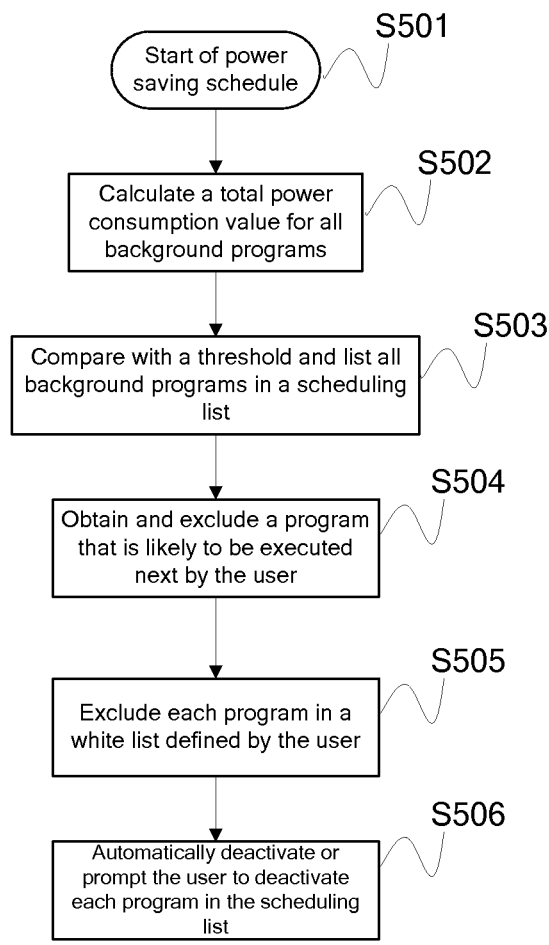
FIG. 5 is a flowchart illustrating a process of intelligent power saving scheduling using a power saving scheduling engine.

The power saving method according to the present disclosure monitors any change in battery level. The power saving schedule will be triggered each time the batter level drops by a predetermined value (e.g., 10%). FIG. 5 is a flowchart illustrating a process of intelligent power saving scheduling using a power saving scheduling engine. After the power saving schedule is initially triggered at step S501, at step S502, a total power consumption value of all currently running programs is calculated. The power consumption value can be calculated by a client in the following three aspects: 1) screen display time occupied by a program, which is read from a system configuration file; 2) CPU usage by a program, which is obtained by calculating an accumulated sum of products of CPU frequency and a CPU step in accordance with the following equation:

$$processPower = ratio * tmpCpuTime * powerCpuNormal[step]$$

where powerCpuNormal[step] denotes the energy consumed by each step, ratio denotes the CPU frequency and tmpCpuTime denotes the time for this step; and 3) network and sensor usage by a program, which is read directly via a system API. Obviously, the power consumption value can be alternatively calculated using other methods known to those skilled in the art.

Then at step S503, the total power consumption value is compared with a threshold W suitable for a current power level percentage and each background program among all the currently running programs is listed in a scheduling list. Here the threshold W is automatically adjusted based on the current power level percentage and is proportional to the current power level percentage. Then at step S504, a program that is likely to be executed next by the user is obtained and excluded from the scheduling list. Next, at step S505, each program in a white list defined by the user is excluded from the scheduling list. Finally at step S506, each program in the scheduling list is automatically deactivated or the user is prompted to deactivate each program in the scheduling list.

It is to be noted that the step 504 of obtaining the program that is likely to be executed next by the user is performed by a background engine using a prediction algorithm based on the history database. In particular, the background engine treats all the currently running programs as a Markov stochastic sequence based on the history database. That is, the program to be executed next by the user is only dependent on the previously executed programs. As an example, when a user clicks a link in a program, the system will open this link automatically using a browser. As another example, when a user shares with his/her friends using applications such as twitter and mailbox while he/she is playing a game, this operation will be performed by the system by invoking a corresponding program.

A state transition matrix for any two programs can be obtained in probabilistic theory by analyzing transition relationships among the programs in the sequence. For example, there are four programs: A, B, C and D and the following matrix can be obtained:

|   | A   | B   | C   | D |
|---|-----|-----|-----|---|
| A | 0   | 0.5 | 0.5 | 0 |
| B | 0.3 | 0   | 0.7 | 0 |
| C | 0.2 | 0.8 | 0   | 0 |
| D | 0.1 | 0.9 | 0   | 0 |

That is, when the program A is currently executed by the user, there is a probability of 0.5 that the program to be executed next by the user will be B and there is a probability of 0.5 that the program to be executed next by the user will be C. The same also applies to other elements in the matrix.

Base on this matrix, a probability that each program will be the program to be executed next can be calculated using Markov process in probabilistic theory. With the calculated probabilities and time dependencies, the program that is most likely to be executed next by the user can be determined.

The time dependency is indicative of an extent to which the program is dependent on a period of time. For example, if the user has played a game A at 8:00 pm every day within 10 days, then the time dependency of the game A on the time of 8:00 pm is 1. If the user has played the game A at 8:00 pm on 9 out of the 10 days and at 7:00 pm on 1 out of the 10 days, then the time dependency of the game A on the time of 8:00 pm is 0.9 and the time dependency of the game A on the time of 7:00 pm is 0.1. As described above in connection with the process for creating the history database, records for programs executed by the user have been stored in the history database. Therefore, the time dependency of each program can be determined by analyzing the record for the program.

Additionally, in order to perform the network schedule using the network scheduling engine, a current network environment is determined using the history database based on current time and the connected network, and, when the mobile device is not used by the user, a background network is managed based on the policy for the current network environment and a frequency at which the user is connected to the network, so as to automatically connect to the network when the user uses the network and maintain the network disconnected when the user does not use the network.

As discussed above, the history database stores a network environment record associated with a network and the time during which the network is used by the user and specifying a policy for managing a background network.

In the present disclosure, it is determined based on the time during which the network is used by the user whether the network environment is an office environment, a home environment or a further environment. Different policies for background network management are specified for different network environments.

For example, if a network having an SSID of A is often used from 9:00 am to 6:00 pm on weekdays, it can be predicted that the network is an office environment. That is, a record for the office environment can be stored in the history database, indicating the SSID of A and the used time from 9:00 am to 6:00 pm on weekdays. Records for the home environment and the further environment can be recorded similarly. The network scheduling engine manages a background network based on these network environments and a frequency at which the user is connected to the network, so as to automatically connect to the network when the user uses the network and maintain the network disconnected when the user does not use the network. If the user is connected to the network A at 10:00 am on Tuesday, it can be determined from the current time and the connected network that it is in an office environment and then the background network can be managed based on the policy for the office environment and a frequency at which the user is connected to the network.

Different policies for background network management can be provided for different network environments. For example, in the further environment (e.g., in a bus or a subway), the user may occasionally use his/her mobile phone during a certain period of time. In this environment, the policy for background network management may indicate to adjust the countdown for deactivating the background network based on the frequency of use by the user, i.e., to prolong the duration for maintaining the network connection in the standby state in the case of a high frequency of use, thereby preventing the mobile phone from being connected to and then disconnected from the network repeatedly. In contrast, in the office environment, the user may maintain a persistent connection with the network. In this environment, the policy for background network management may indicate to define a long time threshold and disconnect from the network only when the user does not use the network for the long time threshold.

An exemplary embodiment of process flow will be given below.

Normally, a user goes to office in the morning and returns home at night every day. The user will access a GPRS network on his way to the office. He uses his mobile phone to browse news on the Internet and listen to music from time to time. Occasionally he plays a game for a while on his way to home at night.

Today he does not go to the office in the morning, but instead attends a meeting at a conference center near the North 5$^{th}$ Ring and goes back to the office in the afternoon. It is assumed that his mobile phone is fully charged before he sets out for the meeting in the morning. The whole working process of the system can be described as follows.

After leaving home, the user browses news on the Internet while listening to music. In the background, the system stores in a database an operation record for each of a browser A and a player B. When the battery level drops to 90%, a schedule is triggered for the first time. At this time, the user may be listening to music in background and the browser program is running in foreground. In this case, a scheduling system will compare the power consumptions of these two processes with each other. Although the power consumptions of the browser A and the player B may both exceed a borderline, the system will not deactivate the browser A since it is running in foreground, but simply pops a prompt box to warn the user. For the player B, the system searches historical records and finds that the user often uses the player program B in this time period and thus simply pops a prompt box to warn the user. If the historical records in the system are not sufficiently specific, the player B may be deactivated by default and a corresponding record will be stored in the LOG.

After arriving at the conference center, the user uses a wifi (wireless fidelity) access point provided by the conference center. At this time, the system detects that the user is using a different access point than the networks he often uses in the home and office environments. The current environment is considered as "a further environment". For such access point, a network history record will be queried and it will be stored in the database. If the user has not used this network before, the connection to the network will be deactivated when the user does not use his mobile phone. If the user uses his mobile phone frequently, e.g., turning the screen on and off every minute, the latency before deactivating the network connection will continuously increase with the historical use record for the network SSID in the database.

Then, the user may execute a game C during a conference break. However, the record shows that the use has never executed this game in this time period (as he is working usually). In this case, if the game is switched to background and the battery level drops to 80%, the power saving schedule will be triggered again to deactivate the game C. If there is a twitter program D running in background and the historical record shows that there is a high probability that the user will use this program in the next time period, then the twitter program D will not be deactivated.

After the conference, the user goes back to office. The wifi access point is now changed to a wifi that has been recorded by the system. In this case, the user unlocks the screen and the system detects an access point by means of wifi scan. By comparing the detected access point and the current time with the network connection time and the network in the office environment as stored in the history database, it is determined that the user has entered the office environment. At this time, a longer latency will be selected before disconnecting from the used wifi network when the mobile phone is in the standby state.

When the user goes off work, the battery level has been relatively low. At this time, the user executes a game E he occasionally plays. In this case, if the power saving schedule is triggered, the system will learn from the record that the game E has been occasionally, but not frequently, used in this time period. Therefore, the system will prompt the user to deactivate the program. Also, the system will disable the wifi network connection since no familiar access point can be detected on the way to home.

Figure 6:
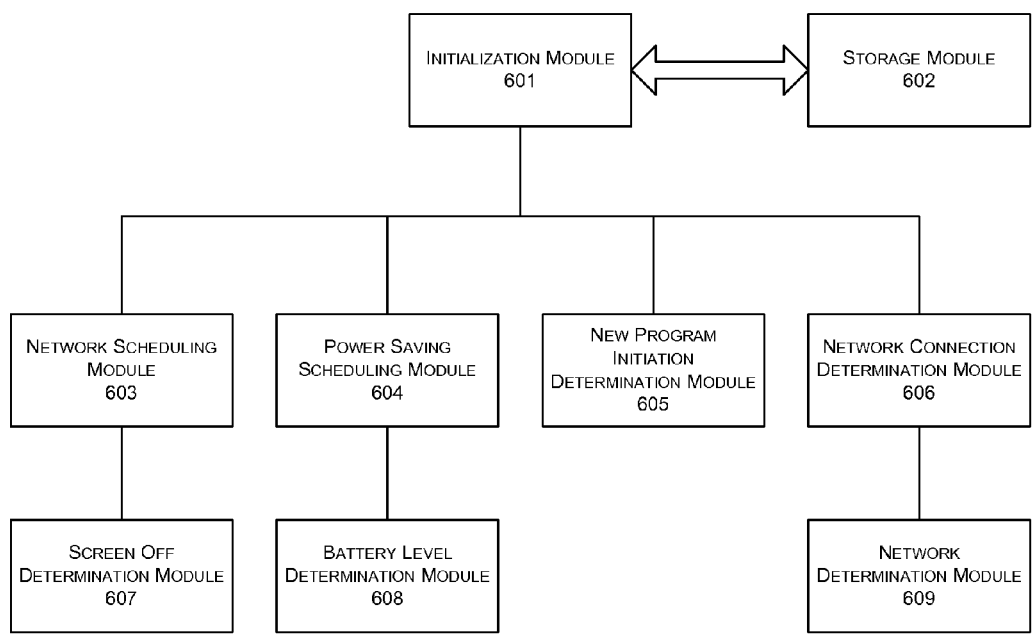
FIG. 6 is a block diagram of a system for saving battery power according to an embodiment of the present disclosure.

FIG. 6 is a block diagram of a system for saving battery power according to an embodiment of the present disclosure. The system for saving battery power includes: a storage module 602 configured to store a history database; a new program initiation determination module 605 configured to determine whether a new program has been initiated by a user and, when a new program has been initiated by the user, store the new program initiated by the user in the history database in the storage module; a network connection determination module 606 configured to determine whether the user is connected to a network and, when the user is connected to a network, store a network connection record of the user in the history database in the storage module; a battery level determination module 608 configured to determine whether a battery level triggers a dynamic power saving schedule; a power saving scheduling module 604 configured to perform the power saving schedule using a power saving scheduling engine when the battery level determination module determines that the battery level triggers the dynamic power saving schedule; a screen off determination module 607 configured to determine whether a screen being turned off triggers a dynamic network schedule; and a network scheduling module 603 configured to perform the network schedule using a network scheduling engine when the screen off determination module determines that the screen being turned off triggers the dynamic network schedule.

In one embodiment, the system for saving battery power further includes: an initialization module 601 configured to initialize operation of the system for saving battery power.

Figure 7:
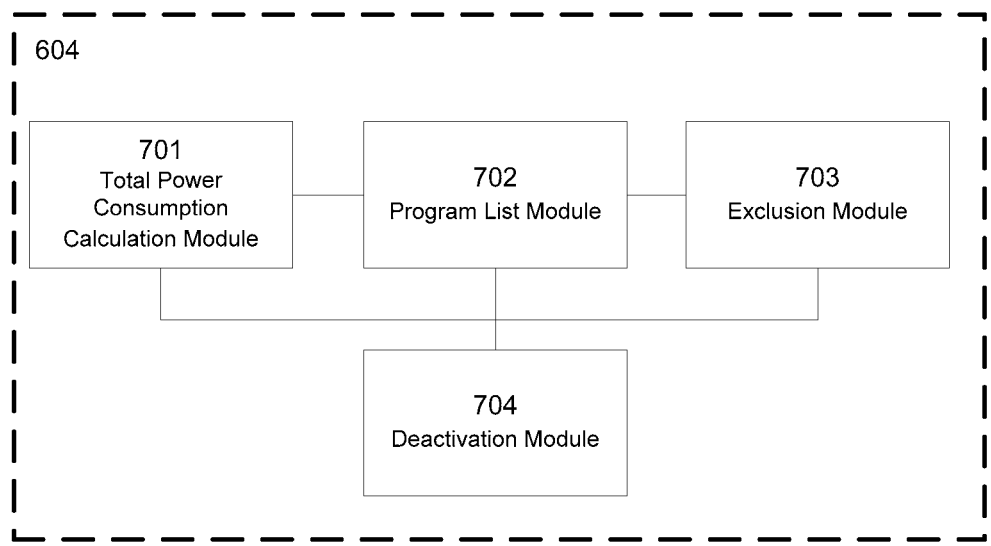
FIG. 7 is a block diagram of a power saving scheduling module according to an embodiment of the present disclosure.

In one embodiment, as shown in FIG. 7, the power saving scheduling module 604 includes: a total power consumption calculation module 701 configured to calculate a total power consumption value of all currently running programs; a program list module 702 configured to compare the total power consumption value with a threshold W suitable for a current power level percentage and list each background program among all the currently running programs in a scheduling list, the threshold W being automatically adjusted based on the current power level percentage and being proportional to the current power level percentage; an exclusion module 703 configured to obtain a program that is likely to be executed next by the user and exclude it from the scheduling list, and exclude from the scheduling list each program in a white list defined by the user, the white list contains a series of programs defined by the user as not being controlled by the power saving schedule; and a deactivation module 704 configured to automatically deactivate or prompt the user to deactivate each program in the scheduling list.

Figure 8:
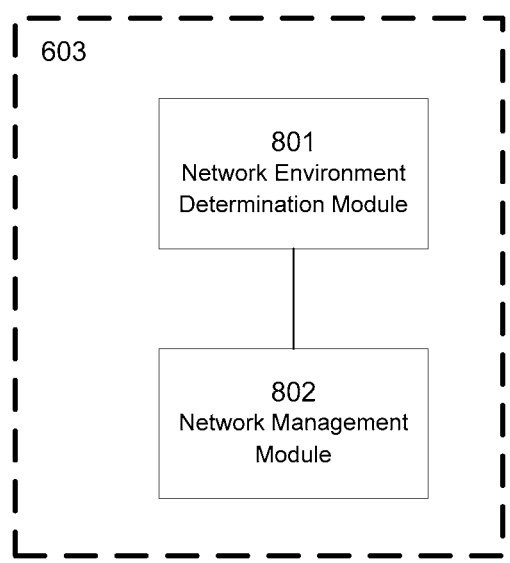
FIG. 8 is a block diagram of a network scheduling module according to an embodiment of the present disclosure.

In one embodiment, as shown in FIG. 8, the network scheduling module 603 includes: a network environment determination module 801 configured to determine a current network environment using the history database based on current time and the connected network, wherein the history database stores a network environment record associated with a network SSID and the time during which the network is used by the user and specifying a policy for managing a background network; and a network management module 802 configured to manage the background network when the mobile device is not used by the user based on the policy for the current network environment and a frequency at which the user is connected to the network, so as to automatically connect to the network when the user uses the network and maintain the network disconnected when the user does not use the network.

The present disclosure provides a power saving solution having an improved intelligence, without affecting general functions. The present disclosure has the following advantages:

1. User habits for using software on a mobile phone and networks are recorded to create a history content database.

2. User behaviors in a next period of time are predicted based on the history content database.

3. A power saving schedule is performed intelligently based on the prediction result, thereby achieving an intelligent power saving effect without affecting the use by the user.

The invention claimed is:

1. A method for saving battery power in a mobile device, comprising:
   determining whether a new program has been initiated by a user and, when a new program has been initiated by the user, storing the new program initiated by the user in a history database;
   determining whether the user is connected to a network and, when the user is connected to a network, storing a network connection record of the user in the history database;
   determining whether a battery level triggers a dynamic power saving schedule and, when the battery level triggers the dynamic power saving schedule, performing the power saving schedule using a power saving scheduling engine; and
   determining whether a screen being turned off triggers a dynamic network schedule and, when the screen being turned off triggers the dynamic network schedule, performing the network schedule using a network scheduling engine.

2. The method for saving battery power of claim 1, further comprising:
   initializing the method for saving battery power before the method for saving battery power begins.

3. The method for saving battery power of claim 1, wherein the step of storing the network connection record of the user in the history database comprises:
   determining whether there has been a record for the network to which the user is connected in the history database and, when there is no record for the network to which the user is connected, creating a record for the network.

4. The method for saving battery power of claim 1, wherein the step of storing the new program initiated by the user in the history database comprises:
   determining whether there has been a record for the new program initiated by the user in the history database and, when there is no record for the new program initiated by the user in the history database, creating a record for the program.

5. The method for saving battery power of claim 1, wherein the step of storing the new program initiated by the user in the history database comprises:
   returning to the step of determining whether a new program has been initiated by the user after storing the new program initiated by the user in the history database.

6. The method for saving battery power of claim 1, wherein the step of performing the power saving schedule using the power saving scheduling engine comprises:
   returning to the step of determining whether a new program has been initiated by the user after performing the power saving schedule using the power saving scheduling engine.

7. The method for saving battery power of claim 1, wherein the step of performing the network schedule using the network scheduling engine comprises:
   returning to the step of determining whether a new program has been initiated by the user after performing the network schedule using the network scheduling engine.

8. The method for saving battery power of claim 1, wherein the step of storing the network connection record of the user in the history database comprises:
   returning to the step of determining whether a new program has been initiated by the user after storing the network connection record of the user in the history database.

9. The method for saving battery power of claim 1, wherein the step of performing the power saving schedule using the power saving scheduling engine comprises:
   calculating a total power consumption value of all currently running programs;
   comparing the total power consumption value with a threshold W suitable for a current power level percentage and listing each background program among all the currently running programs in a scheduling list, the threshold W being automatically adjusted based on the current power level percentage and being proportional to the current power level percentage;
   obtaining a program that is likely to be executed next by the user and excluding it from the scheduling list;
   excluding from the scheduling list each program in a white list defined by the user, the white list contains a series of programs defined by the user as not being controlled by the power saving schedule; and
   automatically deactivating or prompting the user to deactivate each program in the scheduling list.

10. The method for saving battery power of claim 9, wherein the step of obtaining the program that is likely to be executed next by the user comprises:
    treating, by a background engine, all the currently running programs as a Markov stochastic sequence based on the history database, so as to obtain a state transition matrix for any two programs by analyzing transition relationships among the programs in the sequence;
    calculating, based on the state transition matrices, a probability that each program will be the program to be executed next using Markov process; and
    determining the program that is likely to be executed next by the user based on the calculated probabilities.

11. The method for saving battery power of claim 10, wherein the step of determining the program that is likely to be executed next by the user based on the calculated probabilities comprises:
    determining the program that is likely to be executed next by the user based on a time dependency, the time dependency being indicative of an extent to which the program is dependent on time.

12. The method for saving battery power of claim 10, wherein the step of performing the network schedule using the network scheduling engine comprises:
    determining a current network environment using the history database based on current time and the connected network, wherein the history database stores a network environment record associated with a network and the time during which the network is used by the user and specifying a policy for managing a background network; and
    managing the background network when the mobile device is not used by the user based on the policy for the current network environment and a frequency at which the user is connected to the network, so as to automatically connect to the network when the user uses the network and maintain the network disconnected when the user does not use the network.

13. The method for saving battery power of claim 12, wherein the network environment comprises an office environment, a home environment and a further environment.

14. A system for saving battery power in a mobile device, comprising:
    a storage module configured to store a history database;
    a new program initiation determination module configured to determine whether a new program has been initiated by a user and, when a new program has been initiated by the user, store the new program initiated by the user in the history database in the storage module;

a network connection determination module configured to determine whether the user is connected to a network and, when the user is connected to a network, store a network connection record of the user in the history database in the storage module;

a battery level determination module configured to determine whether a battery level triggers a dynamic power saving schedule;

a power saving scheduling module configured to perform the power saving schedule using a power saving scheduling engine when the battery level determination module determines that the battery level triggers the dynamic power saving schedule;

a screen off determination module configured to determine whether a screen being turned off triggers a dynamic network schedule; and a network scheduling module configured to perform the network schedule using a network scheduling engine when the screen off determination module determines that the screen being turned off triggers the dynamic network schedule.

15. The system for saving battery power of claim 14, further comprising:

an initialization module configured to initialize operation of the system for saving battery power.

16. The system for saving battery power of claim 14, further comprising:

a network determination module configured to determine whether there has been a record for the network to which the user is connected in the history database and, when there is no record for the network to which the user is connected, create a record for the network.

17. The system for saving battery power of claim 14, wherein the power saving scheduling module comprises:

a total power consumption calculation module configured to calculate a total power consumption value of all currently running programs;

a program list module configured to compare the total power consumption value with a threshold W suitable for a current power level percentage and list each background program among all the currently running programs in a scheduling list, the threshold W being automatically adjusted based on the current power level percentage and being proportional to the current power level percentage;

an exclusion module configured to obtain a program that is likely to be executed next by the user and exclude it from the scheduling list, and exclude from the scheduling list each program in a white list defined by the user, the white list contains a series of programs defined by the user as not being controlled by the power saving schedule; and a deactivation module configured to automatically deactivate or prompt the user to deactivate each program in the scheduling list.

18. The system for saving battery power of claim 14, wherein the network scheduling module comprises:

a network environment determination module configured to determine a current network environment using the history database based on current time and the connected network, wherein the history database stores a network environment record associated with a network and the time during which the network is used by the user and specifying a policy for managing a background network; and a network management module configured to manage the background network when the mobile device is not used by the user based on the policy for the current network environment and a frequency at which the user is connected to the network, so as to automatically connect to the network when the user uses the network and maintain the network disconnected when the user does not use the network.

\* \* \* \* \*